United States Patent [19]
Dom et al.

[11] Patent Number: 6,166,735
[45] Date of Patent: *Dec. 26, 2000

[54] VIDEO STORY BOARD USER INTERFACE FOR SELECTIVE DOWNLOADING AND DISPLAYING OF DESIRED PORTIONS OF REMOTE-STORED VIDEO DATA OBJECTS

[75] Inventors: Byron Edward Dom, Los Gatos; Dragutin Petkovic, Saratoga, both of Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/984,460

[22] Filed: Dec. 3, 1997

[51] Int. Cl.$^7$ ........................................... G06F 19/00

[52] U.S. Cl. ............................. 345/339; 707/103; 348/12

[58] Field of Search ................................... 707/103, 2, 3, 707/4, 6, 104, 10; 395/500; 345/339, 340, 341; 348/12

[56] References Cited

U.S. PATENT DOCUMENTS

| | | | |
|---|---|---|---|
| 5,521,841 | 5/1996 | Arman et al. | 364/514 A |
| 5,623,589 | 4/1997 | Needham et al. | 395/356 |
| 5,861,881 | 1/1999 | Freeman et al. | 345/302 |
| 5,884,056 | 3/1999 | Steele | 395/339 |
| 5,956,716 | 9/1999 | Kenner et al. | 707/10 |
| 5,970,231 | 10/1999 | Crandall | 395/200.68 |
| 5,999,173 | 12/1999 | Ubillos | 345/328 |

OTHER PUBLICATIONS

Gauch et al, "The Vision Digital Video Library", ACM Digital Libraries, 1996.

Hong Jiang Zhang et al, "An Integrated System for Content-Based Video Retrieval and Browsing", Pattern Recognition, vol. 30, Issue 4, pp. 643–658, 1997.

E. Ardizzone et al., "Automatic Video Database Indexing and Retrieval," Multimedia Tools and Applications 4, pp. 29–56, 1997 Kluwer Academic Publishers, The Netherlands.

E. Ardizzone et al., "Video Indexing Using Optical Flow Field," Proceedings of the International Conference on Image Processing, Lausanne, Switzerland, pp. 831–834.

B. Carlson, "Taking on Visual Recognitions's Tough On–Line Test: Web Still & Video Image Content Search & Retrieval," Advanced Imaging, Apr. 1997, pp. 34, 36, 60.

J.D. Courtney, "Automatic, Object–Based Indexing for Assisted Analysis of Video Data," Proceedings of the ACM Multimedia 96 Conference, Boston, MA, Nov. 1996, pp. 423–424.

M. Ioka et al., "A Method for Retrieving Sequences of Images on the Basis of Motion Analysis," SPIE vol. 1662 Image Storage and Retrieval Systems, 1992, pp. 35–46.

*Primary Examiner*—Wayne Amsbury
*Assistant Examiner*—Uyen Le
*Attorney, Agent, or Firm*—McGinn&Gibb, P.C.; James C. Pintner, Esq.

[57] ABSTRACT

A system and method are provided for supporting video browsing over a communication network such as the Internet/World Wide Web. A graphical user interface is provided through a client software tool such as a Web browser. A client/user selects a video data object stored at a remote server. A set of points within the object are displayed at the client's graphical user interface display, as representations, preferably thumbnail images, of the points within the object. The user selects an interval defined by the representations, preferably by using the graphical user interface to select two of the representations. The two selected representations delimit the beginning and end of a portion of the video object. Responsive to this selection, that portion of the video object is downloaded and displayed.

48 Claims, 4 Drawing Sheets

VIDEO STORY BOARD USER INTERFACE FOR SELECTIVE DOWNLOADING AND DISPLAYING OF DESIRED PORTIONS OF REMOTE-STORED VIDEO DATA OBJECTS

FIELD OF THE INVENTION

The invention generally relates to the field of the storage, viewing, and handling of video data objects. More specifically, the invention relates to computer systems for browsing such video data objects. The invention has particular applicability to viewing and browsing video data objects provided from a remote repository over a network such as the Internet.

BACKGROUND OF THE INVENTION GLOSSARY OF TERMS USED

While dictionary meanings are also implied by certain terms used here, the following glossary of some terms may be useful.

Internet ("the Net"): The connection system that links computers worldwide in a network.

TCP/IP: Transmission Control Protocol/Internet Protocol. A packet switching scheme the Internet uses to chop, route, and reconstruct the data it handles, from e-mail to video.

World Wide Web (WWW. "the Web"): The Internet's application that lets people seeking information on the Internet switch from server to server and database to database by clicking on highlighted words or phrases of interest. An Internet Web server supports clients and provides information.

Home page: A multi-media table of contents that guides a Web user to stored information on the Internet.

Server: A machine (computer) which performs a task at the command of another machine ("client"). In the context of the present invention, a server's primary function is to facilitate distribution of stored information over the Web.

Client: A machine which provides commands to a server, and is serviced by the server. Typically, a client machine is operated by an end user, and functions responsive to user commands.

Web Browser: A program running on a user-operated client computer. When a user "surfs" the Web using a browser, the browser acts as an Internet tour guide, allowing the client machine to display pictorial desktops, directories and search tools supported by the server.

URL: Universal Resource Locator, a Web document version of an e-mail address, in character string form, which uniquely identifies a document, application, or tool available over the Web.

Hyperlink: A network addressing tool embedded in a user-understandable displayed and/or highlighted item, such as a word, phrase, icon or picture. A URL can be accessed by means of its corresponding Hyperlink. When a user on a client machine selects the highlighted hyperlink through the user interface, the underlying item is then retrieved to the client supporting a Web browser.

HTTP Hypertext transfer protocol: Hypertext transfer protocol. The character string "http:" at the beginning of a URL indicates that the document or file designated by the URL contains hyperlinks defined according to the HTTP.

HyperText Markup Language (HTML): HTML is the language used by Web servers to create and connect documents that are viewed by Web clients. HTML uses Hypertext documents. Other uses of Hypertext documents are described in the following U.S. Patents:

Bernstein et al., U.S. Pat. No. 5,204,947, issued Apr. 20, 1993;

Bernstein et al., U.S. Pat. No. 5,297,249, issued Mar. 22, 1994; and

Lewis, U.S. Pat. No. 5,355,472, issued Oct. 11, 1994; all of which are assigned to International Business Machines Corporation.

BACKGROUND OF THE INVENTION

In recent years, the technologies of video data compression, storage, and interactive accessing have converged with network communications technologies, to present exciting prospects for users who seek access to remotely stored multimedia information.

In the area of network communications technologies, particularly exciting has been the recent prominence of the Internet and its progeny, the World Wide Web. The Internet and the Web have captured the public imagination as the so-called "information superhighway." Accessing information through the Web has become known by the metaphorical term "surfing the Web."

The Internet is not a single network, nor does it have any single owner or controller. Rather, the Internet is an unruly network of networks, a confederation of many different networks, public and private, big and small, whose human operators have agreed to connect to one another. The composite network represented by these networks relies on no single transmission medium. Bi-directional communication can occur via satellite links, fiber-optic trunk lines, phone lines, cable TV wires and local radio links.

To this point the World Wide Web (Web) provided by the Internet has been used in industry predominately as a means of communication, advertisement, and placement of orders. The World Wide Web facilitates user access to information resources by letting people jump from one server to another simply by selecting a highlighted word, picture or icon (a program object representation) about which they want more information—a maneuver known as a "hyperlink". In order to explore the WWW today, the user loads a special navigation program, called a "Web browser" onto his computer.

There are a number of browsers presently in existence and in use. Common examples are Netscape's "Navigator," Microsoft's "Explorer," Mosaic's browser, and IBM's "Web Explorer." Browsers allow a user of a client to access servers located throughout the world for information which is stored therein. The information is then provided to the client by the server by sending files or data packets to the requesting client from the server's storage resources.

Part of the functionality of a browser is to provide image or video data. Web still image or video information can be provided, through a suitably designed Web page or interface, to a user on a client machine. Still images can also be used as Hypertext-type links, selectable by the user, for invoking other functions. For instance, a user may run a video clip by selecting a still image.

However, video data objects are very large, or, to put it more precisely, the quantity of data per unit time in a real-time viewing of a video data object is large. As a consequence, access by a user to a desired video data object is subject to data throughput constraints. The present state of the art makes it impracticable to provide more than a few tens of seconds of real-time video over the Internet with a response time that will be satisfactory to a user.

Also, many video objects are stored in compressed format, and must be decompressed for playback or browsing. Formats such as Motion JPEG and QuickTime compress video on a frame-by-frame basis. Accordingly, access to a desired part of the video is relatively easy: a time stamp or token may be used for direct access to the desired point in the video.

In the MPEG compression format, however, compression is done over the time domain as well, so decompression of a significant amount of real video time may be required for access to a given point.

Therefore, multimedia and communication systems for providing users with access to video data objects, for browsing, searching, etc., must grapple with the problem of providing video data in a manner which best utilizes the available throughput to provide video data in a form which is most useful to the user.

With this design objective in mind, let us now consider the state of the art in the technologies of video data compression, storage, and interactive accessing. Recent work has been done to make video material more available and usable over the Web. For instance, an article in the August 1995 issue of *ADVANCED IMAGING*, by Amy T. Incremona, titled "Automatically Transcribing and Condensing Video: New Technology is Born", describes a method for providing video having an accompanying textual index, such as audio narration or closed caption text. Still images are presented, along with a transcription of audio text that accompanies the images (illustration on page 60). This information is provided in HTML format. Thus, a user can take advantage of the temporal correspondence between video shots and narration or closed caption text. To find a desired point in the video corresponding with a known point in the text, the user performs a key word search for the known point in the text. The result of this key word search is that the desired point in the video is reached.

Additionally in Shahraray et al., "Automatic Generation of Pictorial Transcripts of Video Programs", SPIE Vol. 2417, pp. 512–518, there is described an automatic authoring system for the generation of pictorial transcripts of video programs which are accompanied by closed caption information. The system employs a table having a series of rows, each row containing a pointer to a location of an image, and another pointer to the beginning of a text segment related to the image. A viewing window for a GUI display in FIG. 4 of Shahraray et al., shows a video image 2, a closed caption text subtitle area 4, and a basic user control area 6. The basic user controls include a "Seek" slider 8.

Accordingly, the state of the art allows for user access to video information based on associated text. However, a more general method for accessing video, not provided by the prior art, would sever the tie between video images and accompanying audio narration or closed caption text.

Co-pending, co-assigned U.S. patent application Ser. No. 08/581,300, filed Dec. 28, 1995, Steele, "Method and System for Video Browsing on the World Wide Web" (incorporated herein by reference) describes a system and method for providing convenient user access to a stored video object without requiring that access to the video object be keyed with any text or other accompanying indicia, not actually part of the video itself.

The Steele method for displaying, on a user terminal, video data object information pertaining to a stored video data object, the stored video object including a temporal beginning point, a temporal end point, and temporal intermediate points therebetween, comprises the following steps:

First, a sequence of representations of points within the video data object, preferably still images, is provided to the user through a user interface. Each representation or still image that is provided corresponds with one of the temporal points in the video data object.

In a typical environment, in which the user is an Internet/World Wide Web user, and the video data object is stored in a remote repository accessible through a server, the step of providing the representations includes performing suitable operations to identify points within the video data object, for which representations are to be provided. Generally, an automatically operating tool is used to identify the points, and the points are chosen based on a predetermined criterion. A preferred criterion is the presence of scene cuts, in which the content of adjacent video images changes relatively drastically. However, where scenes are relatively lengthy, frames within the scene, i.e., between the cuts at the beginning and end of the scene, are also provided.

Then, a user interface is provided, including means for allowing a user to select an interval between first and second ones of the temporal points. The user interface is preferably a graphical user interface (GUI), as is commonly made available through computer operating systems such as IBM's OS/2 and Microsoft's Windows operating systems. Also, suitable user interface equipment, such as a video screen and a mouse, are preferably used.

Finally, responsive to user selection of such an interval, a subsequence of representations is provided, each representation of the subsequence corresponding with a respective temporal point in the video data object, each of the respective temporal points falling between the first and second temporal points selected as discussed above.

Therefore, by providing this capability, the Steele invention allows a user to iteratively home in on the portion of a lengthy, large video object that he/she is interested in. The Steele invention advantageously eliminates the need to use text accompanying the video object as a crutch, as was done in the prior art discussed above.

However, once a user identifies a desired segment within a video, he/she will likely want to view the segment. Accordingly, the segment must be downloaded. Conventionally, users have had to download the entire video, and run it from the beginning until the desired segment is reached. This conventional operation, as taught in the Steele patent, has been inconvenient for the users, both in terms of download time and in terms of browsing of desired segments within a larger video.

More recently, streaming technology has become available, in which a full download followed by playback is replaced by download concurrent with playback, or download in shorter segments, and playback concurrent with download, perhaps with pauses if the segments do not keep up with real time playback. However, such streaming still provides the drawback that a user does not have random access to the content of a video, but must view the video from the beginning until a section of interest is reached.

Therefore, there remains a need for further techniques for improving the user's ease of access to desired video material.

SUMMARY OF THE INVENTION

It is therefore an object of the present invention to facilitate convenient user browsing of video objects stored at a remote repository, such as a remote network server.

It is a further object of the invention to reduce the download time through which a user must wait before he/she can view a desired portion of a video data object.

It is a further object of the invention to allow a user to conveniently view only a desired portion of a larger video object, rather than requiring that the user watch the video object from the beginning up to the desired segment.

To achieve these and other objects, there is provided, in accordance with the invention, a system and method for facilitating user examination and browsing of video data object information pertaining to a stored video data object (hereinafter referred to as an "Object"). For convenience if discussion, an Object will be characterized as including a beginning point, an end point, and intermediate points therebetween.

The invention, in its incarnation as a method, comprises the steps now to be listed. (The invention may also be embodied in a system comprising means for performing the steps listed.)

First, a sequence of representations of points within the video data object, preferably still images, is provided to the user through a user interface. Each representation or still image that is provided corresponds with one of the temporal points in the video data object. Preferably, the representations are thumbnail images of stills from the video Object.

The stills are obtained through a selection technique not part of the present invention. Stills may be selected through known techniques. Preferably, the stills, when scanned in sequence by the user's eyes, should give the user a sense of the content of the video. This may be, but is not necessarily, achieved by spacing the stills uniformly in time, such as at regular time intervals.

The stills are arranged chronologically, preferably in rows. Accordingly, by scanning the thumbnail images in order, the user can get a quick sense of the progression of the content of the Object. It is therefore deemed appropriate to refer to the set of displayed thumbnail images as a "story board."

The invention has applicability to any system or architecture in which a user, at an interactive terminal, client node, etc., communicates with a video object repository. The invention is conceived, however, as having particular applicability to the Internet. In a typical environment, then, the user is an Internet/World Wide Web user, and the video data object is stored in a remote repository accessible through a server.

The step of providing the representations includes performing suitable operations, e.g., automatically performed operations, to identify points within the video data object, for which representations are to be provided. As a preferable alternative, the step of providing presupposes that the identified points have previously been determined, prior to operation of the invention, and are stored along with the Object itself.

Several additional aspects of the invention, which are also preferred, are as follows: Exactly where the identified points are located within the Object is not essential to the invention.

The next step of the method of the invention is that a user interface is provided, including means for allowing a user to select an interval between first and second ones of the temporal points. The user interface is preferably a graphical user interface (GUI), as is commonly made available through computer operating systems such as IBM's OS/2 and Microsoft's Windows operating systems. Also, suitable user interface equipment, such as a video screen and a mouse, are preferably used.

Where the invention is to be applied in an Internet/World Wide Web environment, the GUI may be provided in the form of a Web page, having suitable features for providing user information, including the story board, and for receiving user input commands.

Employing the user interface, the user selects an interval in terms of the points in time, within the video, represented by the displayed representations. Numerous ways of doing this are given in the detailed description. One example, given here for summary purposes, is to select two frames, not necessarily adjacent to each other in time. The two selected frames delimit an interval within the video represented by the story board. For many GUI-type user interfaces as discussed above, the user selection my be made, for instance, by clicking on two of the thumbnail images of the story board.

Responsive to the selection of the two frames, the interval of the video, delimited by those frames, is downloaded and provided. Since only that interval, rather than the whole Object, is downloaded, the download time is advantageously reduced.

Therefore, by providing the capability of selecting and downloading only a desired portion of a larger Object, the invention allows a user to efficiently obtain the portion of a lengthy, large video object that he/she is interested in. The invention advantageously eliminates the lengthy download time which would be required if the entire video were downloaded.

The user will find the invention useful when he/she wants to quickly scan, or preview, the gist of the video without actually watching the full motion data from beginning to end.

As a further time saving, which is advantageous even over conventional streaming playback, the user need not watch a lengthy video Object from the beginning, if he/she is only interested in a portion of the video. Rather, by judiciously choosing the desired interval, the user can begin viewing at the desired spot, within the Object. Thus, the invention advantageously facilitates video browsing.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

The invention may be practiced in connection with any system in which a user operates a local computer system, having a suitable user interface such as a GUI, for browsing a video Object stored in a separate or remote repository.

It will be understood that all such systems, architectures, methods, etc., which would be deemed suitable for use by a person skilled in the art, fall within the spirit and scope of the invention. The scope of the invention, thus, also covers systems residing entirely a single, local site. Communications would then take place over direct local connections, and remote point-to-point network communication is omitted. For instance, a local file system at a single location may serve as a repository for video objects which a user might want to access. Such a system would, by itself, contain all elements of the invention.

However, the discussion which follows will focus on an exemplary application of the invention to the Internet/World Wide Web environment. It will be understood that this exemplary discussion in no way limits the wider applicability of the invention. It will be understood, for instance, that any "intranets" for distinct populations of users, which may be separated from the overall Internet by means of "firewalls" of the like, fall within the spirit and scope of the invention.

Figure 1:
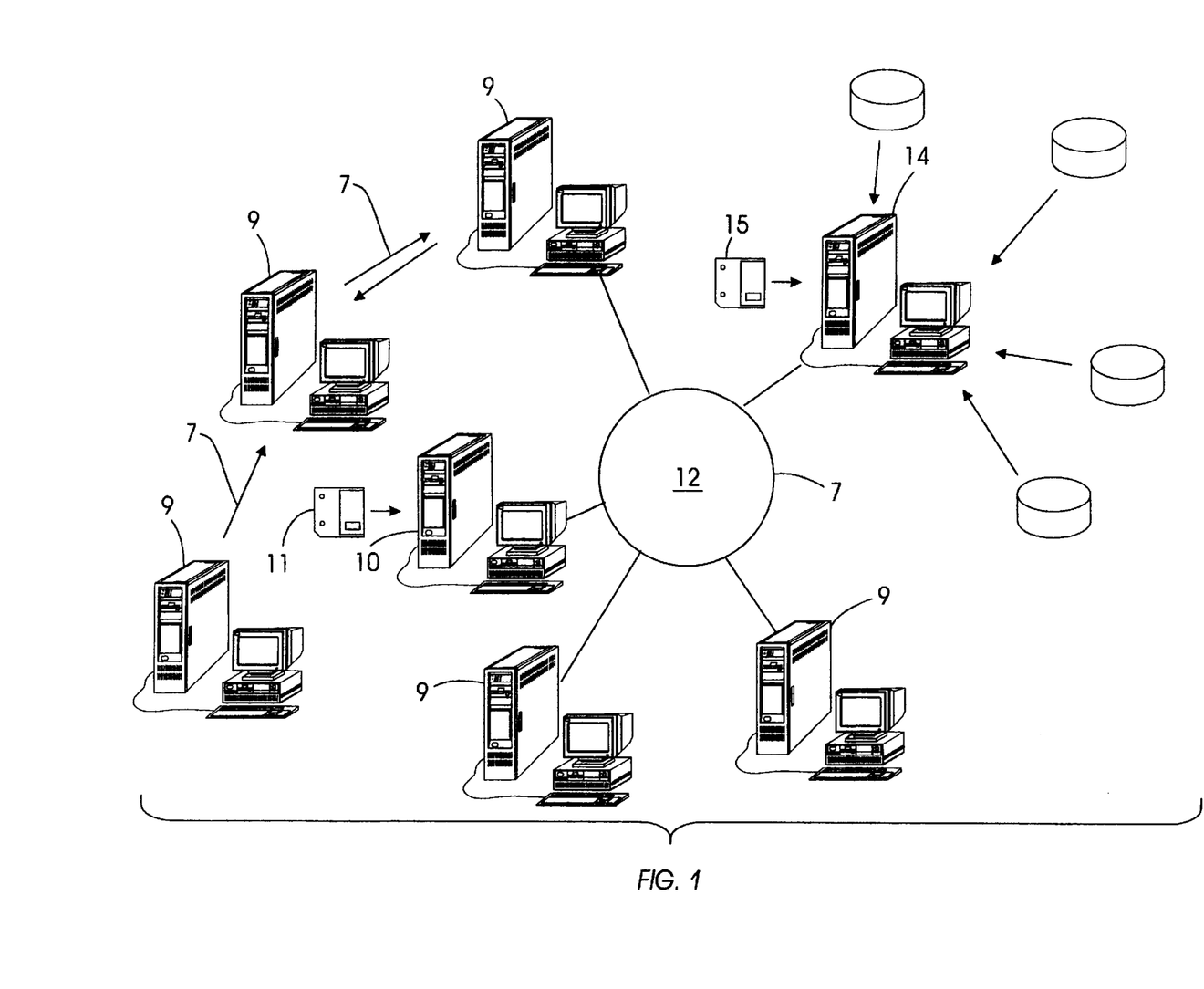
FIG. 1 is a system block diagram of a typical distributed computer system which has internal and external networks, including the Internet, to connect clients to World Wide Web servers and other servers, the client systems being capable of incorporating the invention.

FIG. 1 illustrates a typical communication and processing system, including nodes (computers, processors, etc.) and communication media-therebetween, making up an information delivery solution of a typical combination of resources including clients, servers, information repositories, and communication links or networks. Various nodes, shown typically as 9, are also coupled to one another by various networks, shown generally as 7, which may include local area networks (LANs), wide area networks (WANs), etc.

The discussion of FIG. 1 which follows will focus on certain individual components for clearer illustration and description of the novel and non-obvious features of the present invention. In the system of FIG. 1, a client machine 10 includes a computer or other device (as discussed above), running a Web browser program. The program run by the client 10, which incorporates the invention, may be provided to a general purpose computer by means of a commercial computer program product, such as a pre-recorded floppy disk 11 or other suitable computer-readable recording medium. In such a computer program product, the novel and non-obvious features of the invention, implemented as program code, are pre-programmed onto the disk 11 for convenient sales and marketing, and for directing operation of the client machine 10 in accordance with the invention.

The client 10 is coupled, through a communication network 12 such as the Internet, to a Web server 14. Physical access to the Internet is provided in conventional fashion. The general command protocols, etc., for exchanging messages between the client 10 and the server 12, are also conventional.

The client machine 10 may preferably be an intelligent computer system, such as an IBM PS/2 computer, an IBM ThinkPad laptop computer, or an IBM RISC System 6000 workstation. Communication coupling made to the network via a suitable communication interface software tool, such as IBM's OS/2 WARP Connect software product.

The Web browser in the client machine 10 may preferably be the IBM Web Explorer software product, or equivalent software tools such as the Netscape or Mosaic tools. This computer system 10 is bi-directionally coupled with the OS/2 WARP Connect facility over a line or via a wireless system to the server machine 14. The server machine 14 may preferably be another IBM PS/2 computer, an IBM RISC System 6000 workstation, or other similar system.

The program run by the server 14, which incorporates the invention, may be provided to a general purpose computer on a pre-recorded medium, as discussed above, such as a floppy disk 15, in which case the novel and non-obvious features of the program code are pre-programmed onto the disk 15 for convenient sales and marketing, and for directing operation of the server machine 14 in accordance with the invention.

STORAGE OF VIDEO OBJECTS ACCORDING TO THE INVENTION

In accordance with the invention, video objects are represented by a set of representations of temporal points within the object. In a preferred embodiment, employing the Web and HTML links, the representations of the temporal points are thumbnail images corresponding with the temporal points in the video object. The images may be generated at the time a user selects the video object for browsing, or preferably are generated beforehand, and stored along with the object itself.

The temporal points at which the representations are to be taken may be selected in any suitable fashion. It is preferred that the temporal points be selected at scene cut points in the video object. Known techniques for scene cut selection may be used. See, for instance, a description given in U.S. patent application Ser. No. 08/581,300 (referred to in the Background section of the present patent application). The temporal points may be chosen at random within the video object.

However, in another possible embodiment of the invention, the temporal points are evenly spaced throughout the video object. It should be noted here that "evenly spaced" is intended to have a subjective, rather than literal, meaning. As will be described in detail below, the user selects two of the termporal points, with the objective of downloading and viewing the portion of the video object that falls between the two temporal points. It is preferable, from the standpoint of the system's look and feel to the user, that the time duration of the selected video portion ("clip" or "segment") be perceived as proportional to the number of representations captured within the interval selected by the user. Where the user will feel such a proportionality, the subjective criterion for "even spacing" is deemed to have been achieved.

OPERATION OF THE INVENTION

Given the foregoing comments, a description of the operation of a user interface according to the invention will now be described.

A preferred embodiment of the invention employs a client machine supporting a user interface utilizing HTML format, and further employs the World Wide Web. Some of the functionality of the invention may be carried out at the server. However, the description which follows will be readily understandable from the vantage point of the user at the client machine.

This description will take the operation of the invention in chronological sequence. The description will be given with reference to a high level flowchart shown in FIG. 2.

Figure 2:
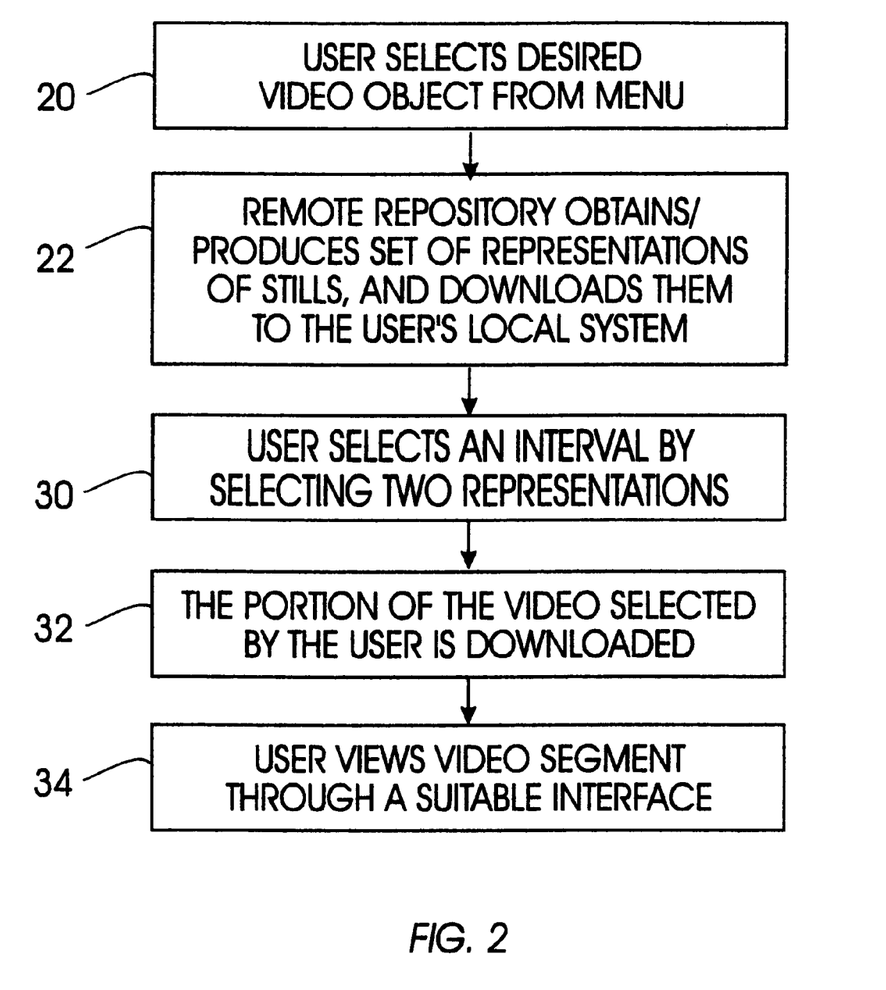
FIG. 2 is a flowchart showing the method of the invention.

A user begins by selecting a video object from a directory of stored objects (step 20). This may be done in any suitable fashion, based on known graphical interface techniques. The Web provides numerous known formats, techniques, etc., for selecting objects.

For instance, responsive to an initial user command establishing contact with the remote repository, a menu of video titles could be displayed. The user may then select a desired title by clicking on it, typing its identifier into a field, etc.

Responsive to the user selection of a desired video object, the remote system obtains a set of representations of points within the video object (step 22). Preferably, the representations are thumbnail images of stills from the video object, so that the user can scan his/her eyes along the thumbnails and get a sense of the progression of the content (action, narrative, etc.) of the video object. This sense helps the user to determine which portion of the video object is of interest.

Note that the terms "representations," "thumbnails," "stills," etc., will be used interchangeably. It will be understood, however, that the spirit and scope of the invention extends broadly over all forms of representation that a person skilled in the art would understand to be suitable for use. The various other, more specific, terms will be used for illustrative purposes.

In accordance with the invention, it is these representations which are downloaded in response to the user's selection of a desired video object. Advantageously, the set of representations may be downloaded much more quickly than the entire video object could be downloaded.

Figure 3:
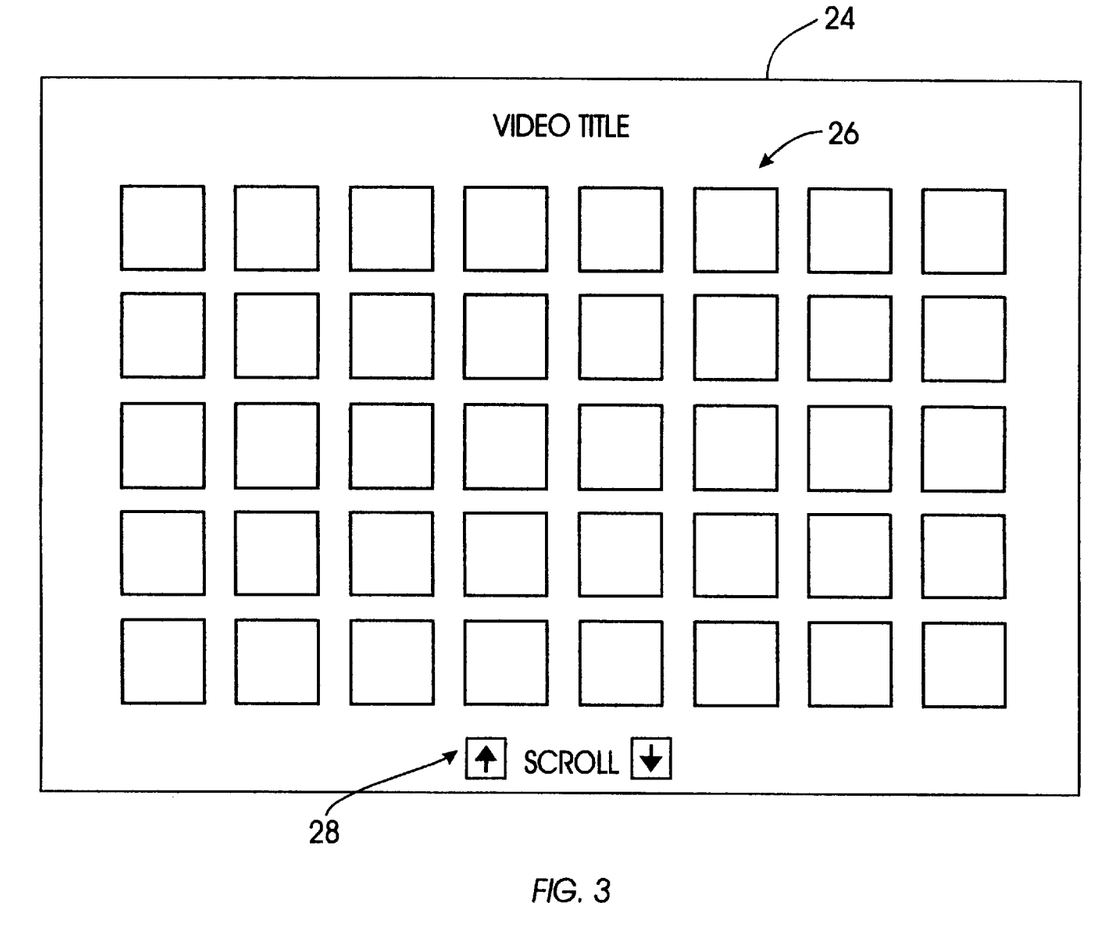
FIG. 3 is an illustration of a user interface in accordance with the invention.

FIG. 3 is an illustration of a user interface according to the invention. On a graphical user interface, such as a Web page 24, a group of thumbnail images, generally shown as 26, are displayed. The number of thumbnails will likely be enough to fill a GUI screen, or even greater than that.

Where the number of thumbnails exceed the space provided by the screen, a paging or scrolling feature may be provided. In FIG. 3., a scroller arrangement 28, including scroll-up and scroll-down buttons, is provided. Responsive to user mouse clicks or the like, the displayed thumbnails may be scrolled by row, by page, etc.

Returning to FIG. 2, the user, viewing a display such as that of FIG. 3, selects an interval within the video object (step 30). This may be done simply by clicking on two of the thumbnails. Other techniques may also be used. For instance, the user may depress and hold a mouse button (preferably, the left button) while sliding the mouse from a first thumbnail to a second one.

Also, the user may have the option of selecting a single thumbnail, and entering a suitable commend to indicate that the portion from the beginning to that thumbnail, or from that thumbnail to the end, is desired.

Yet another option would be to select a single thumbnail and request a specified quantity of real time from that point. For instance, the user might select a thumbnail and request ten seconds of video, starting at that point.

Also, where a single representation is selected, the user may request a segment from the beginning to the selected point, or from the selected point to the end.

For these and other options, suitable user interfaces in addition to the scroller 28 are provided in the user interface of FIG. 3.

Optionally, as a safeguard, the user interface may include a predetermined ceiling for the total amount of video to be requested, so that the user will not inadvertently request a large segment. For instance, if ten seconds is the threshold, the system optionally warns the user before processing a request for a segment exceeding ten seconds in duration. Upon confirmation of the request, such as by clicking on a YES/NO button, the request is processed.

Still other techniques will suggest themselves to persons skilled in the GUI field, and such other techniques fall within the spirit and scope of the invention, as given broadly in terms of step 30.

Once the user has specified a desired segment of video, in accordance with the invention that video segment is downloaded (step 32). Since only the desired portion of the video is downloaded, the invention provides an advantageously fast response to the users segment selection.

It is recognized, however, that, where the video object is compressed in a time-domain format, such as MPEG, some additional processing time, at the repository, will be expended doing the decompression that is necessary to find the desired segment of video. It may be the case that this finding is expedited by starting at a point in the MPEG-compressed video prior to the beginning of the requested section. It may be expedient, in some applications, to download a segment containing more than the video actually requested, but beginning at an expedient MPEG decompression point. Then, the local system decompresses starting at that point, and discards whatever initial portion of the decompressed video was not requested.

The particular technique of downloading the video is not essential to the invention. It is contemplated, however, that either a full download followed by playback, or streaming, are techniques that will be useful in implementing systems incorporating the user interface of the invention.

Figure 4:
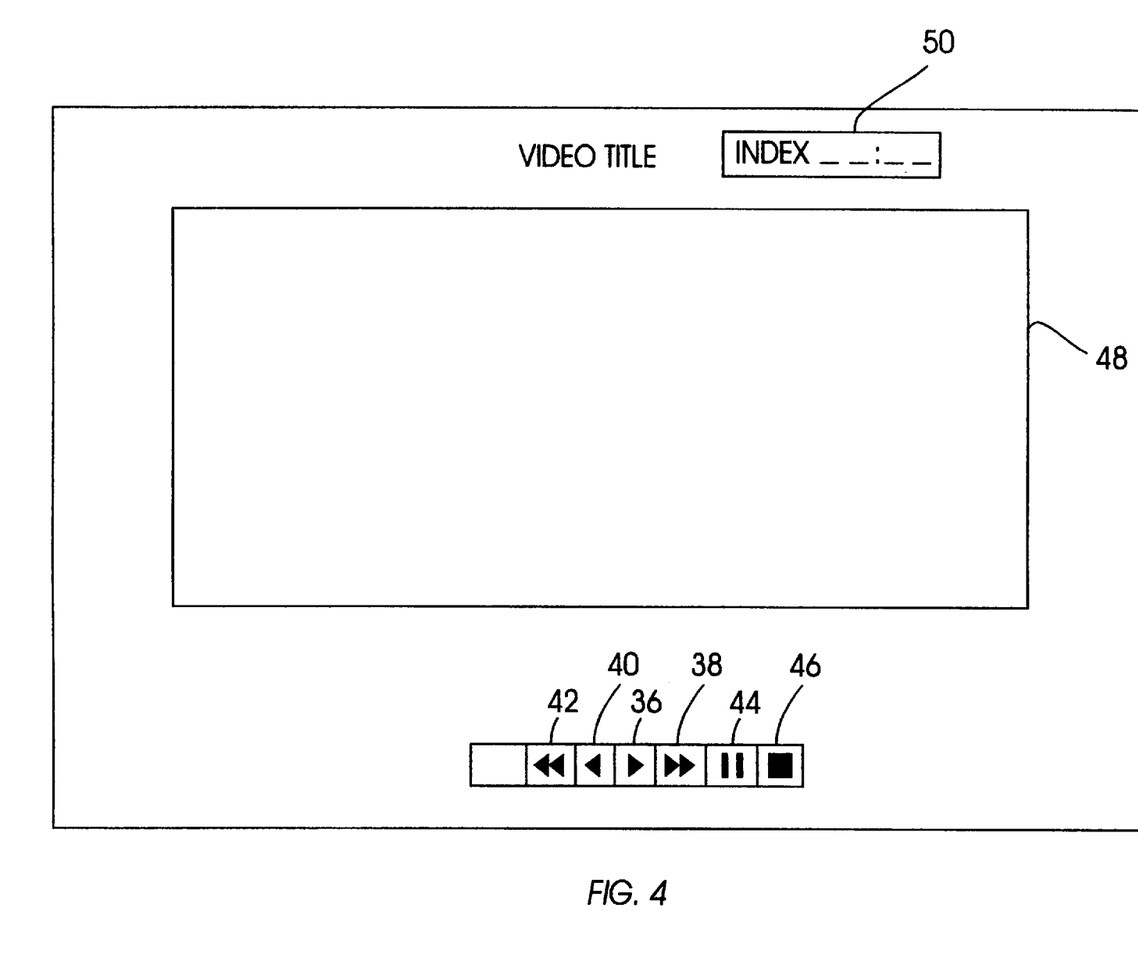
FIG. 4 is an illustration of a user interface in accordance with the invention.

Finally, the segment is played back, at real time speed or as otherwise desired, responsive to the user's command. FIG. 4 shows a playback interface, which is displayed after the user makes the selection from the user interface of FIG. 3. A typical playback control interface, including controls to allow the user to select normal playback 36, fast forward 38, reverse playback 40, fast reverse 42, pause 44, stop 46, etc., is provided. The video is shown in a display window 48.

Also, a control may be supplied to return the user to the selection interface of FIG. 3. Where a World Wide Web interface is used, the Web browser will likely supply forward and backward buttons. In such a case, these may be used.

Optionally, a video index timer 50 may be provided to give the user a measurement of the real time either within the selected segment or within the entire video. Index values may also be supplied with the thumbnails of FIG. 3.

Note that display systems employing the invention need not play audio. Audio is conveniently omitted. However, audio can be added separately, or the sound track can be treated similarly to the way the video is treated. That is, clips of the sound track can be downloaded and played, in the same manner that some compact disk digital audio players allow a user to search through an audio track by playing short fragments of sound in a fast-forward process. By following general, perceivable aspects such as pitch, volume, etc, the user is able to home in on a desired portion of the sound track. Thus, treatment of the audio sound track in this fashion complements the invention's approach to the video.

These techniques for summarizing the video have been found to be highly intuitive for average user. That is, the users who have tried an implementation of the invention have not needed any training or explaining on how to interpret the images the system provides.

HOW THE STORYBOARD FILES ARE CREATED:

It is preferred that the set of frames making up the storyboard are automatically created at the time the video data is prepared for storage in the repository, and are loaded into the database along with the data.

Story Board data files are prepared after the scene changes are identified, using known techniques. This can be done either from compressed or from non-compressed video.

FILE SIZES AND SOME STATISTICS:

Various videos have different structure depending on their content. Full featured movies have, for example, longer scenes than MTV music videos or commercials.

The keyframes are displayed to the user by means of a standard HTML Web browser, or any other image viewer. Here, where only static images are displayed, the average reduction in size of the data in the story board, relative to that of a MPEG-1 file, is about a factor of 100.

Here are statistics from clips of four feature movies and from four IBM commercials.

Full feature movies, measured by analyzing one clip from each of the 4 movies, average clip being about 30 sec.

Keyframe size for SB is 12 KBytes (color).

Average reduction in size MPEG-1 size/MB size=19 times.

Average reduction in size MPEG-1 size/SB size=127 times.

Average number of keyframes per second 0.38.

NOTE: This data heavily depends on the content. Scenes with more action will have more keyframes.

IBM Commercials, 4 full commercials analyzed, average length 41 sec.

Average reduction in size MPEG-1 size/MB size=14

Average reduction in size MPEG-1 size/SB size=64

Average number of keyframes per second 0.24.

The numbers, obviously, vary with content, but these provide an order of magnitude, which is believed to have wide applicability in a variety of different types of video content.

Assuming, for the sake of illustration, that a keyframe interval averages in the range of 2–4 seconds, for one minute of video, the story board SB provides about 15–30 keyframes. If each of the keyframes is color, and requires a typical value of about 12 kilobytes, then the total data for the entire story board SB is about 180–360 Kbytes per minute of video. The amount of time to transfer these keyframes, and the number of HTML pages needed to do so, may readily be estimated from this data total, given the remote link data transfer rate.

SUMMARY AND CONCLUSION

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A system for facilitating user examination and browsing of video data object information pertaining to a stored video data object (herein denoted "Object"), the Object including a beginning point, an end point, and points therebetween, the system comprising:

an information processing apparatus having a user interface unit and a coupling unit for coupling to a video repository having video data objects, including the Object, stored therein;

a sending unit for sending, through the user interface unit and over the medium, a request to view the Object;

a receiving unit, responsive to receipt of a response to the request to view, for receiving a data file of reduced-size, thumbnail images of video stills and related audio portions from the respective points of the Object, each thumbnail image corresponding with one of the points in the Object;

a viewing unit for displaying the thumbnail images prior to a portion of said Object being downloaded;

an audio unit for playing said related audio portions with said display of said thumbnail images prior to said portion of said Object being downloaded;

a user-operable selecting unit for selecting an interval in terms of the points, the interval delimiting the beginning and end of said portion of the Object which the user desires to view; and a downloading unit, operable responsive to operation of said selecting unit for downloading and providing the portion of the Object within the selected interval;

said viewing unit for facilitating user viewing of the downloaded portion.

2. A system as recited in claim 1, wherein:

the video repository is located locally to the system; and said coupling unit includes a local coupling connection.

3. A system as recited in claim 1, wherein said coupling unit includes a communication interface for coupling with a network communication medium, the medium being coupled to the video repository, the video repository being located at a location remote from the information processing apparatus.

4. A system as recited in claim 3, wherein:
the user interface unit includes a computer having a World Wide Web browser; and
the communication interface includes an Internet interface.

5. A method for facilitating user examination and browsing of video data object information pertaining to a stored video data object (herein denoted "Object"), the Object including a beginning point, an end point, and points therebetween, the method to be practiced by an information processing apparatus having a user interface unit and a coupling unit for coupling to a video repository, wherein said video repository has said video data objects, including the Object, stored therein, the method comprising:
sending, through the user interface unit and over a medium, a request to view the Object;
responsive to receipt of a response to the request to view, receiving a data file of reduced-size, thumbnail images of video stills and related audio portions from the respective points of the Object, each thumbnail image corresponding with one of the points in the Object;
playing said related audio portions while displaying said thumbnail images on said user interface unit prior to a portion of said Object being downloaded;
receiving, from a user, a selection of an interval in terms of the points, the interval delimiting the beginning and end of said portion of the Object which the user desires to view;
responsive to the selection of an interval, downloading and providing the portion of the Object within the selected interval; and
facilitating user viewing of the downloaded portion.

6. A system as recited in claim 1, wherein said displaying unit is also for displaying the thumbnail images in an array, the thumbnail images being in positions in the array related to their respective positions within the Object.

7. A system as recited in claim 6, wherein:
the number of thumbnail images from the data file exceeds a display capacity of the user interface unit;
the thumbnail images are scrollably displayed on the user interface unit; and
said displaying unit is also for displaying a user-manipulable user interface tool for allowing the user to control scrolling of the displayed thumbnail images.

8. A system as recited in claim 1, wherein:
the sequence of representations includes representations of scene change points within the Object and representations of points within scenes of the Object; and
the system further comprises a setting unit for setting a parameter giving a number of representations within scenes to be displayed.

9. A system as recited in claim 1, wherein said receiving unit is also for receiving a data file of images of video stills from the respective points of the Object; and
said system further including a displaying unit for displaying the images on the user interface unit.

10. A system as recited in claim 9, wherein said displaying unit is also for displaying the images successively in time, whereby the user is able to perceive a flow of action in the Object.

11. A system as recited in claim 10, wherein said displaying unit is also for displaying the images one of:
at a fixed time interval;
at a time interval related to a real time interval, within the Object, between successive images; and
at a rate controlled by the user.

12. A system as recited in claim 10, wherein said displaying unit includes a user-manipulable user interface tool for allowing the user to control a time interval between successively displayed images.

13. A system as recited in claim 10, wherein said audio unit is also for playing an audio sound track along with successively displayed images.

14. A system as recited in claim 1, wherein said selecting unit is also for selecting desired ones of the representations by mouse clicks.

15. A system as recited in claim 14, wherein said selecting unit is also for selecting first and second ones of the representations, which represent the beginning and end, respectively, of the desired portion of the Object.

16. A system as recited in claim 14, wherein said selecting unit is also for selecting one of the representations, the desired portion of the Object being specified in terms of one of:
(i) from the beginning of the Object to a selected representation,
(ii) from the selected representation to the end of the Object,
(iii) from the selected representation to an immediately succeeding one of the representations, and
(iv) from the selected representation forward for a specified amount of time.

17. A system as recited in claim 1, wherein said viewing unit includes user-operable controls for at least one of (i) playback, (ii) fast-forwarding, (iii) reverse playback, (iv) fast reverse playback, and (v) pause.

18. A computer program product, for use with an information processing apparatus having a user interface unit and a coupling unit for coupling to a video repository having stored video data objects, including a stored video data object (herein denoted "Object"), stored therein, for facilitating user examination and browsing of video data object information pertaining to the Object, the Object including a beginning point, an end point, and points therebetween, the computer program product comprising:
a computer-usable medium;
a set of directions, provided on the medium, for directing the information processing apparatus to send, through the user interface unit, a request to view the Object;
said directions, operable responsive to receipt of a response to the request to view, are also for directing the information processing apparatus to receive a data file of reduced-size, thumbnail images of video stills and related audio portions from the respective points of the Object, each thumbnail image corresponding with one of the points in the Object, and to play said related audio portions while displaying said thumbnail images on said user interface unit prior to a portion of said Object being downloaded;
said directions, operable responsive to user command, are also for directing the information processing apparatus to select an interval in terms of the points, the interval delimiting the beginning and end of said portion of the Object which the user desires to view;
said directions, operable responsive to operation of the information processing apparatus selecting an interval, are also for downloading and providing the portion of the Object within the selected interval; and
said directions are also for directing the information processing apparatus to facilitate user viewing of the downloaded portion.

19. A method as recited in claim 5, wherein:

the video repository is located locally to the system; and said coupling unit includes a local coupling connection.

20. A method as recited in claim 5, wherein said coupling unit also includes a communication interface for coupling with said medium, the medium being coupled to the video repository, the video repository being located at a location remote from the information processing apparatus.

21. A method as recited in claim 20, wherein:

the user interface unit includes a computer having a World Wide Web browser; and the communication interface includes an Internet interface.

22. A computer program product as recited in claim 18, wherein said directions are also for directing the information processing apparatus to select desired ones of the representations by mouse clicks.

23. A method as recited in claim 5, wherein the displaying includes displaying the thumbnail images in an array, the thumbnail images being in positions in the array related to their respective positions within the Object.

24. A method as recited in claim 23, wherein:

the number of thumbnail images from the data file exceeds a display capacity of the user interface unit;

the thumbnail images are scrollably displayed on the user interface unit; and the displaying further includes displaying a user-manipulable user interface tool for allowing the user to control scrolling of the displayed thumbnail images.

25. A method as recited in claim 5, wherein:

the sequence of representations includes representations of scene change points within the Object and representations of points within scenes of the Object; and the method further comprises setting a parameter giving a number of representations within scenes to be displayed.

26. A method as recited in claim 5, wherein the receiving and displaying of said sequence includes:

receiving a data file of images of video stills from respective points of the Object; and displaying the images on the user interface unit.

27. A method as recited in claim 26, wherein the displaying includes displaying the images successively in time, whereby the user is able to perceive a flow of action in the Object.

28. A method as recited in claim 27, wherein the displaying includes displaying the images one of:

at a fixed time interval;

at a time interval related to a real time interval, within the Object, between successive images; and at a rate controlled by the user.

29. A method as recited in claim 27, wherein the displaying further includes displaying a user-manipulable user interface tool for allowing the user to control a time interval between successively displayed images.

30. A method as recited in claim 27, further comprising the playing an audio sound track along with the successively displayed images.

31. A method as recited in claim 18, wherein the selecting of said interval includes selecting desired ones of the representations by mouse clicks.

32. A method as recited in claim 31, wherein the selecting includes selecting first and second ones of the representations, which represent the beginning and end, respectively, of the desired portion of the Object.

33. A method as recited in claim 31, wherein the selecting includes selecting one of the representations, the desired portion of the Object being specified in terms of one of:

(i) from the beginning of the Object to a selected representation, (ii) from the selected representation to the end of the Object, (iii) from the selected representation to an immediately succeeding one of the representations, and (iv) from the selected representation forward for a specified amount of time.

34. A method as recited in claim 5, wherein the facilitating of user viewing includes providing user-operable controls for at least one of (i) playback, (ii) fast-forwarding, (iii) reverse playback, (iv) fast reverse playback, and (v) pause.

35. A computer program product as recited in claim 22, wherein said directions are also for directing the information processing apparatus to select first and second ones of the representations, which represent the beginning and end, respectively, of the desired portion of the Object.

36. A computer program product as recited in claim 35, wherein:

the video repository is located locally to the system; and said coupling unit includes a local coupling connection.

37. A computer program product as recited in claim 18, wherein said coupling unit includes a communication interface for coupling with a network communication medium, the network communication medium being coupled to the video repository, the video repository being located at a location remote from the information processing apparatus.

38. A computer program product as recited in claim 37, wherein:

the user interface unit includes a computer having a World Wide Web browser; and the communication interface includes an Internet interface.

39. A computer program product as recited in claim 22, wherein said directions are also for directing the information processing apparatus to select one of the representations, the desired portion of the Object being specified in terms of one of:

(i) from the beginning of the Object to a selected representation, (ii) from the selected representation to the end of the Object, (iii) from the selected representation to an immediately succeeding one of the representations, and (iv) from the selected representation forward for a specified amount of time.

40. A computer program product as recited in claim 18, wherein said directions are also for directing the information processing apparatus to display the thumbnail images in an array, the thumbnail images being in positions in the array related to their respective positions within the Object.

41. A computer program product as recited in claim 40, wherein:

the number of thumbnail images from the data file exceeds a display capacity of the user interface unit;

the thumbnail images are scrollably displayed on the user interface unit; and said directions are also for directing the information processing apparatus to display a user-manipulable user interface tool for allowing the user to control scrolling of the displayed thumbnail images.

42. A computer program product as recited in claim 18, wherein:

the sequence of representations includes representations of scene change points within the Object and representations of points within scenes of the Object; and said directions are also for directing the information processing apparatus to set a parameter giving a number of representations within scenes to be displayed.

43. A computer program product as recited in claim 18, wherein said directions are also for directing the information processing apparatus to receive a data file of images of video stills from the respective points of the Object; and for directing the information processing apparatus to display the images on the user interface unit.

44. A computer program product as recited in claim 43, wherein said directions are also for directing the information processing apparatus to display the images successively in time, whereby the user is able to perceive a flow of action in the Object.

45. A computer program product as recited in claim 44, wherein said directions are also for directing the information processing apparatus to display the images one of:

at a fixed time interval;

at a time interval related to a real time interval, within the Object, between successive images; and at a rate controlled by the user.

46. A computer program product as recited in claim 44, wherein said directions are also for directing the information processing apparatus to display a user-manipulable user interface tool for allowing the user to control a time interval between successively displayed images.

47. A computer program product as recited in claim 44, wherein said directions are also for directing the information processing apparatus to play an audio sound track along with successively displayed images.

48. A computer program product as recited in claim 18, wherein said directions are also for directing the information processing apparatus to provide, at the user interface unit, user-operable controls for at least one of (i) playback, (ii) fast-forwarding, (iii) reverse playback, (iv) fast reverse playback, and (v) pause.

\* \* \* \* \*